United States Patent
Beldring et al.

(10) Patent No.: US 8,114,290 B2
(45) Date of Patent: Feb. 14, 2012

(54) FILTER DEVICE

(75) Inventors: Finn Beldring, Virum (DK); Christian Rasmussen, Tjele (DK)

(73) Assignee: Grundfos Management a/s, Bjerringbro (DK)

(*) Notice: Subject to any disclaimer, the term of this patent is extended or adjusted under 35 U.S.C. 154(b) by 530 days.

(21) Appl. No.: 12/300,198

(22) PCT Filed: May 3, 2007

(86) PCT No.: PCT/EP2007/003889
§ 371 (c)(1), (2), (4) Date: Dec. 8, 2008

(87) PCT Pub. No.: WO2007/128484
PCT Pub. Date: Nov. 15, 2007

(65) Prior Publication Data
US 2009/0261031 A1    Oct. 22, 2009

(30) Foreign Application Priority Data
May 10, 2006 (EP) .................................. 06009604

(51) Int. Cl.
*B01D 33/21* (2006.01)
*B01D 29/41* (2006.01)
*B01D 35/26* (2006.01)

(52) U.S. Cl. ........ 210/327; 210/331; 210/334; 210/415; 210/416.1

(58) Field of Classification Search ............... 210/297, 210/324, 327, 330, 331, 332, 334, 346, 369, 210/402, 415, 416.1
See application file for complete search history.

(56) References Cited

U.S. PATENT DOCUMENTS

| | | | |
|---|---|---|---|
| 1,525,449 A * | 2/1925 | Johnson | 210/415 |
| 3,437,208 A * | 4/1969 | Gutwirth et al. | 210/331 |
| 3,884,805 A * | 5/1975 | Bagdasarian et al. | 210/334 |
| 3,948,776 A * | 4/1976 | Donovan | 210/332 |
| 3,989,629 A * | 11/1976 | Donovan | 210/334 |
| 4,054,528 A * | 10/1977 | Treiber | 210/415 |
| 4,066,546 A * | 1/1978 | Sasaki | 210/332 |
| 5,326,512 A | 7/1994 | Stillwagon et al. | |
| 2010/0176049 A1 * | 7/2010 | Rasmussen | 210/334 |

FOREIGN PATENT DOCUMENTS

| | | |
|---|---|---|
| DE | 196 24 176 A1 | 1/1998 |
| DE | 202 10 294 U1 | 11/2002 |
| EP | 0 723 799 A1 | 7/1996 |
| EP | 1 149 619 A1 | 10/2001 |
| JP | 6-210295 A | 8/1994 |

OTHER PUBLICATIONS

Translation of JP 6-210295, Aug. 1994.*

* cited by examiner

*Primary Examiner* — Christopher Upton
(74) *Attorney, Agent, or Firm* — Panitch Schwarze Belisario & Nadel LLP

(57) ABSTRACT

A filter device includes a housing (2) having at least two rotation bodies (4,) which are arranged therein and are driven by a shaft (3). The rotation bodies (4) are designed and arranged for producing a centrifugal pumping effect. A guidance device (7) is provided between the rotation bodies (4), which connects the pressure side (6) of a first rotation body (4) to the suction side (5) of a rotation body (4, 18) arranged therebehind in the flow direction (8). The intermediate spaces between the rotation bodies are provided with a filter arrangement.

19 Claims, 5 Drawing Sheets

FILTER DEVICE

CROSS-REFERENCE TO RELATED APPLICATIONS

This application is a Section 371 of International Application No. PCT/EP2007/003889, filed May 3, 2007, which was published in the German language on Nov. 15, 2007, under International Publication No. WO 2007/128484 A1 and the disclosure of which is incorporated herein by reference.

BACKGROUND OF THE INVENTION

The invention relates to a filter device having a housing and at least two rotation bodies arranged in the housing and driven by a shaft. Such filter devices consist typically of stacks of hollow filter plates, which are arranged in an essentially cylindrical filter housing, also in a rotating manner as the case may be. The fluid to be filtered is introduced into the housing and goes through the filter formed in the region of the surface of the filter plates into the inside of the plates, and from there into a central channel, via which the filtered fluid is drawn off. Such filter plates are known, for example, from German published patent application DE 196 24 176 A1 or European patent application publication no. EP 0 723 799 A1, and corresponding filter arrangements are known from DE 196 24 176 A1 as well as U.S. Pat. No. 5,326,512.

Since the filter housing is mostly subjected to the fluid to be filtered from an end-side, the material held back by the filter typically connects at the end of the filter device which is distant to the feed opening. If a tough scum forms here, it may be a problem to remove this from the filter device. Flushing procedures and back-flushing procedures are unfavorable, since they interrupt the continuous filter operation.

BRIEF SUMMARY OF THE INVENTION

Against this background, it is the object of the invention to design a filter device of the known type, such that a removal of the filter mass remaining in the device is improved.

The filter device according to an embodiment of the invention comprises a housing in which at least two, typically a stack, of rotation bodies are arranged driven by a shaft. According to an embodiment of the invention, the rotation bodies are thereby designed and arranged for producing a centrifugal pumping effect, wherein at least one guidance device is provided between the rotation bodies, which connects the pressure side of a first rotation body to the suction side of the rotation body which is arranged behind the first rotation body in the flow direction, and wherein either the rotation bodies themselves or even additionally the intermediate spaces between the rotation bodies, are provided with a filter arrangement in this filter device.

The basic concept of the present invention is to improve the transport of the filter mass which is held back by the filter arrangement, within the filter housing, by designing and arranging at least two, preferably several, of the rotation bodies, for producing a centrifugal pump effect, wherein a guidance device is provided within the filter housing between the rotation bodies producing the centrifugal pump effect, which ensures that the pressure side of a first rotation body is connected to the suction side of a rotation body which is arranged therebehind in the flow direction. According to an embodiment of the invention, the filter arrangements may thereby be provided either on the rotation body side or in the region of the intermediate spaces between the rotation bodies. The rotation bodies and the guidance device are thereby arranged such that a type of multi-stage pump arises within the filter housing, so that the pressure level in the flow direction of the filter mass increases from the entry to the exit. This is particularly advantageous, since specifically on account of the greater pressure in the region of the outlet of the filter mass, this filter mass may yet reliably be led away from the filter device there, even if it is a tough mass in the form of mush. The rotation bodies, which are arranged and designed such that they have a centrifugal pumping effect, take up the fluid close to the shaft, and transport this outwardly in accordance with the active principle of a centrifugal pump. Then, with the help of a suitable guidance device, the higher speed of the fluid at the outer periphery of the rotation body is converted into pressure, which is then led through the guidance device in a targeted manner to the suction side of the rotation body which is arranged therebehind in the flow direction, this rotation body again ensuring a pressure increase.

In order to form such a guidance device in a manner as effective as possible and with little constructional effort, according to a further embodiment of the invention, one envisages providing at least two plates arranged in a stationary manner in the housing. These plates form part of the guidance device and, seen in the flow direction, the first plate comprises or forms a flow channel distant to the shaft, and the second plate, seen in the flow direction, comprises or forms a flow channel which is close to the shaft. With the help of two such plates, the flow feedback from the outer periphery of a rotation body to the region of the subsequent rotation body, this region being close to the shaft, may be effected in a very efficient manner, and the pressure gain which may be achieved on account of the centrifugal pumping effect may be led to the next rotation body in the manner of a multi-stage pump.

According to a further embodiment of the invention, one or preferably both plates comprise filter arrangements, wherein these plates, since they are arranged within the housing in a stationary manner, are usefully connected on the outer side via a discharge channel arranged there, in order to withdraw the filtered fluid in this region.

Basically, according to the invention, any suitable filter arrangement may be applied. However, it is particularly advantageous if the filter arrangement is formed by a hollow filter plate, as known in the prior art and whose preferred design is described further below. An ideal pump effect is achieved, if, according to a further embodiment of the invention, the rotation body is formed by a centrifugal pump impeller. In particular, if several such centrifugal pump impellers are arranged one after the other within the device, an intensive removal of the filter mass is effected, so that even tough filter masses and ones largely freed of fluid, may be pumped out of the device.

A less intensive pump effect, but instead a more compact filter device, may be achieved, according to another embodiment of the invention, by the rotation bodies also being formed by filter plates themselves, which are conductively connected via at least one channel to the discharge channel in the shaft for the removal of the filtered fluid. Thereby, either the filter plate itself is designed encouraging the centrifugal pumping effect or, as the case may be, even additionally may be driven with an increased speed, in order to achieve a suitable pump effect.

According to one embodiment of the invention, the filter plate forming the rotation body, is designed with a suction-port-like opening near the outer periphery of the shaft, so that the fluid to be delivered within the filter housing penetrates the filter plate close to the shaft, then flows along the filter plate surface from the inner periphery to the outer periphery, whereupon the conversion of the kinetic energy into potential energy, i.e. into a pressure again, is effected within the guidance device. In order, on the one hand, to permit the discharge of the filtered fluid which has reached within the filter plate, through the central shaft, but on the other hand, to create a suction port structure as efficient as possible in the region close to the shaft, according to an embodiment of the invention, one envisages the filter plate forming the rotation body comprising a central recess, which is mechanically as well as conductively connected to the shaft merely via spokes which form channels. The spokes are usefully arranged distributed symmetrically to the rotation axis and are to be dimensioned such that, on the one hand, an adequate cross section for the removal of the filtered fluid is formed, and on the other hand, the torque required for the drive of the rotation body may be transmitted.

According to a preferred embodiment of the invention, the rotation bodies are designed in the form of rotating filter plates, which are driven via the central shaft, and discharge the filtered fluid through the central shaft. The guidance device is preferably also formed by filter plates, which however, since they are connected to the housing in a rotationally fixed manner, are connected via a discharge channel within the housing for leading away the filtered fluid. The housing, which advantageously has an essentially cylindrical design, advantageously comprises an annular channel as a discharge channel on the outer side. Such an annular channel may be formed in a simple manner by the housing being formed in a double-walled manner in this region. In this manner, on the one hand, an adequate cross section for the discharge channel is formed, and on the other hand, a very compact constructional shape is formed.

In order to keep the flow losses within the filter device due to backflow in the region of the rotation body as low as possible, particularly with the use of a centrifugal pump impeller within the device, a centrifugal pump impeller is usefully arranged such that the suction port of the centrifugal pump impeller projects up into the recess of the stationary filter plate arranged in front, the recess surrounding the shaft at with a spacing.

In particular, if filter plates are applied as rotation bodies, it is advantageous if the rotation bodies are arranged in groups of two or more rotation bodies, wherein then in each case a guidance device is arranged between the groups of rotation bodies. The arrangement of rotatably driven filter plates in groups effects an improved centrifugal pumping effect, in particular if the filter plates are only adapted to a small extent with regard to the centrifugal pumping effect, and merely comprise a suction-port-like recess in the region around the shaft, and otherwise correspond to the designs according to the prior art.

The filter mass, which is delivered by the device with the help of the previously described pumping effect, may be led completely or partly in the circuit, wherein then a suitably large quantity of fluid yet to be filtered is to be added, in order to reduce the concentration of the filter mass in relation to the fluid. The filter fluid, which is withdrawn through the shaft and the annular channel on the outer periphery of the housing, is then available for further use.

The filter device according to the invention may not only be applied as a filter, but preferably also as a part of a biological reactor, wherein the device then simultaneously serves for the circulation of the fluid/masses located in the reactor, or at least supports this. It is to be understood that then, as the case may be, no closed filter housing is required, but merely a tubular housing which creates the hydraulic environment required for the pumping effect.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
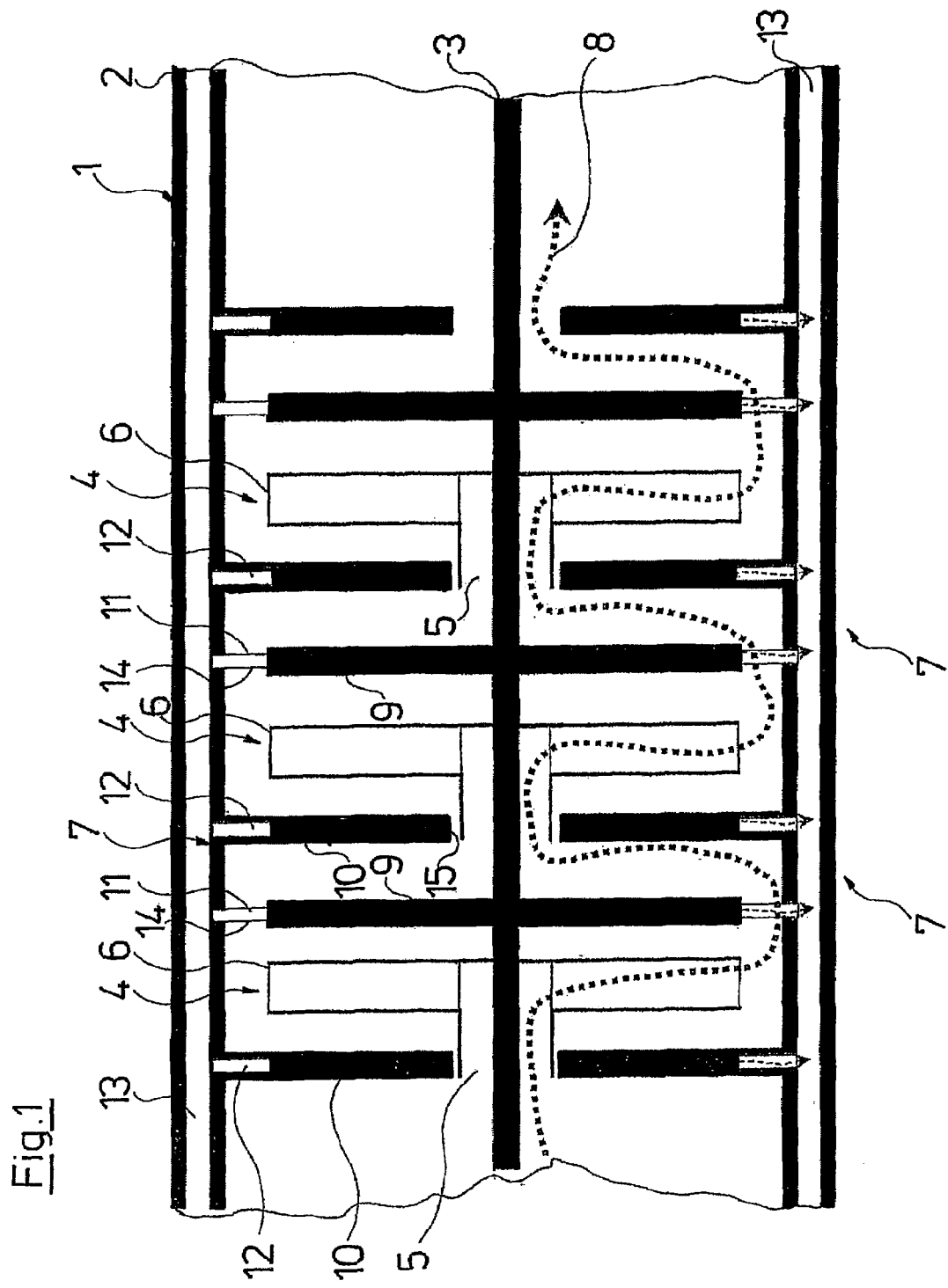
FIG. 1 is a schematic, simplified representation of a longitudinal section through a part of a filter device according to one embodiment of the invention.

The filter device 1 represented by FIG. 1, in a middle section, comprises a cylindrical housing 2, close to whose end on the left in FIG. 1 an inlet for the fluid to be filtered is provided. In an analogous manner, an outlet for the filter mass remaining in the housing 2 after the filter procedure, is provided on the right end of the filter device, seen in the representation according to FIG. 1.

A shaft 3 runs centrally through the housing 2 and is mounted in the end-side covers of the housing 2, which are not represented, and is driven in a rotatable manner by a motor arranged outside the housing 2. A multitude of rotation bodies in the form of centrifugal pump impellers 4 are seated on the shaft 3 in a rotationally fixed manner. The centrifugal pump impellers 4, which are shown only schematically in FIG. 1, in each case comprise a suction port 5 and a pressure side 6 arranged radially to the outside. The impellers are in each case hydraulically separated from the adjacent impeller 4 by guidance devices 7 within the housing 2, in a manner such that the pressure side 6 of one impeller is hydraulically connected via the guidance device 7, to the suction port 5 of the impeller 4 which is subsequent in the throughflow direction of the housing 2. Each guidance device 7 consists of a first filter plate 9, which is arranged in a stationary manner in the housing and which is seen in the flow direction 8, as well as a second filter plate 10, which is arranged with a spacing thereto. With regard to the filter plates, these are hollow plates which form a mechanical filter over their entire surface, through which fluid located in the filter device 1 may pass, but not the matter suspended therein. The filter plates 9 and 10 are firmly connected to the housing 2, wherein their inner space, via radial channels 11 and 12, runs out in a discharge channel 13 on the housing side, which is formed by an annular channel of the housing 2 formed in a double-walled manner in this region. The fluid, which has penetrated through the filter plates 9 and 10 into the inside of the plates and then been filtered, is led via the channels 11 and 12 into the discharge channel 13 and from there out of the filter device 1.

The respective first filter plate 9 of a guidance device 7 reaches up to the shaft 3 and is sealed with respect to this. Each first filter plate 9 ends radially outwardly at a significant distance to the inner side of the housing 2 and is connected in the region of its radial outer side, via spokes 14, to the housing 2, the insides of which spokes form the radial channels 9. These spokes 14 ensure that an adequate free space remains between the filter plate 9 and the inner wall of the housing 2, so that the fluid which is sucked by the centrifugal pump impeller 4 via the suction port 5 and which exits radially at the pressure side 6 of the impeller 4, is deflected by about 180°, in order then to pass between the first filter plate 9 and the second filter plate 10, back in the direction of the shaft 3 and thus to the suction port 5 of the impeller 4 which follows next in the throughflow direction 8. For this, the second filter plate 10 comprises a central recess 15, into which the suction port 5 of the centrifugal pump impeller 4 engages. The outer side of the second filter plate 10 connects to the inner side of the housing 2 in a flush and tight manner, wherein radial channels 12 are formed, which connect the inside of the second filter plate 10 to the discharge channel 13.

Since a multitude of such centrifugal pump impellers 4, each with a subsequently arranged guidance device 7, are arranged one after the other within the filter device 1, and the pressure gain of an impeller 4 lying in front in the flow direction 8 is led via the guidance device 7 to the suction port of the impeller 4 lying therebehind, the filter device 1 operates according to the principle of a multi-stage pump, i.e. the pressure within the housing 2 increases in FIG. 1 from the left to the right after each impeller 4. This has the effect that, on account of the pressure increase, in the throughflow direction 8, on the one hand a fluid discharge through the filter plates 9 and 10, which becomes more and more intensive is effected, and on the other hand the mass remaining within the filter device 1 is delivered with an increased pressure in the direction 8 and thus to the exit of the filter device 1. Thus, an intensive filtering occurs with a simultaneously constant discharge of the residual masses, which occur in the device and which may have a mush-like consistency at the exit side.

Figure 2:
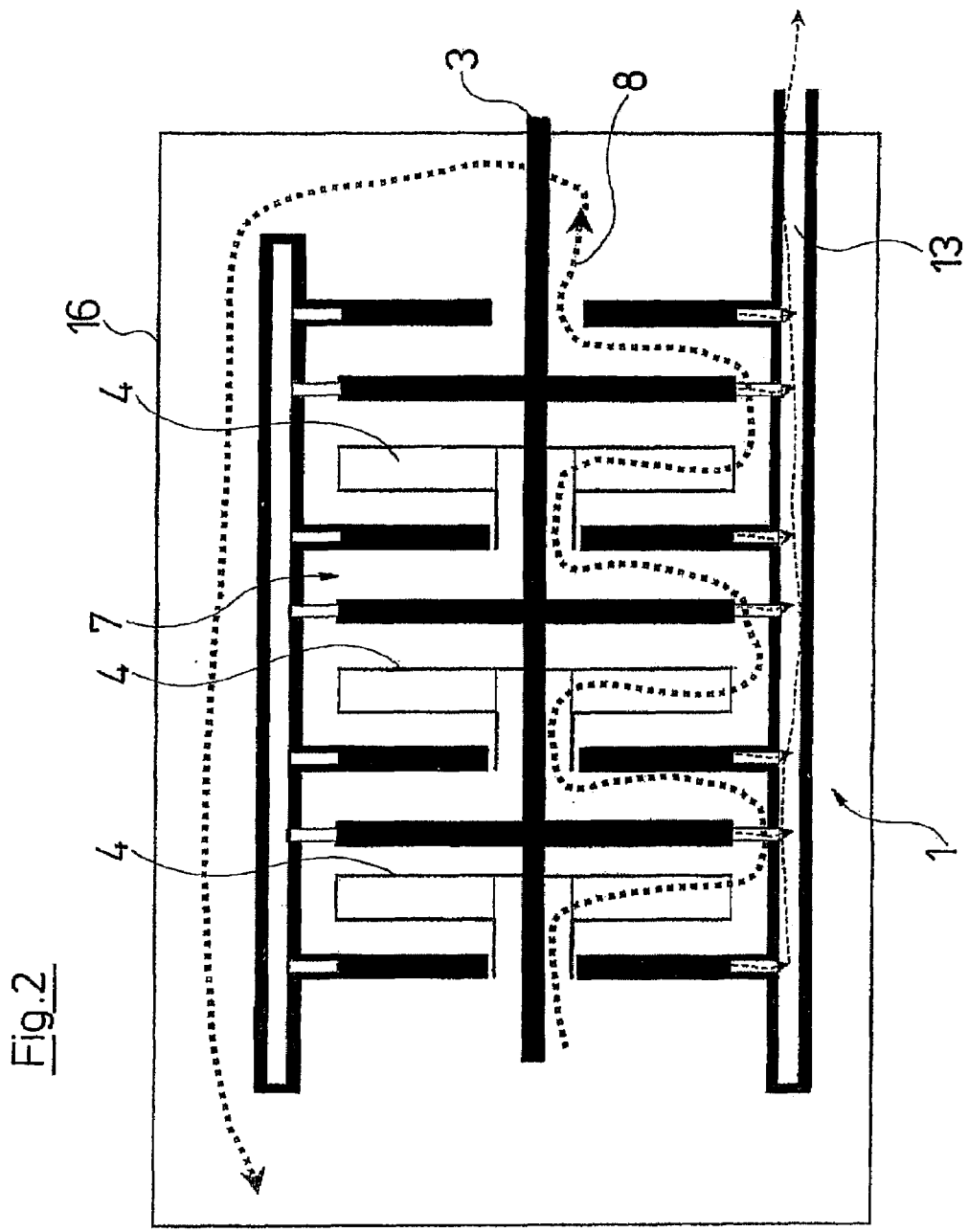
FIG. 2 is a schematic representation of a filter device according to FIG. 1 within the reactor.

With the representation according to FIG. 2, it is schematically indicated how the filter device previously described by FIG. 1 may be arranged within a reactor. Such reactors are applied, for example, for treating waste water. The reactor housing is characterized at 16 and typically, apart from the actual filter device, comprises further assembly parts, but since the remaining assembly parts are not essential with regard to the realization of the invention, these are represented here only with regard to the filter device. It is to be understood that the assembly housing typically has a multiple of the longitudinal extension of the filter device 1. The central discharge channel 13, as FIG. 2 shows, is led out of the reactor housing 16, whereas the conveyor flow is led through the filter device 1 in the circuit. However, suitable measures for the discharge of the remaining mass are provided. As this embodiment example is to make particularly clear, in this case the filter device 1 has no closed housing, but one which is open at the end sides, since here the housing merely has the task of ensuring the required hydraulic closure to the outside in the region of the centrifugal pump impellers 4 and the guidance devices 7, whereas the actual housing function is ensured by the reactor housing 16. The represented filter device 1 may typically serve for circulating the fluid located in the reactor, since the filter device 1 has the effect of a multi-stage pump.

Figure 3:
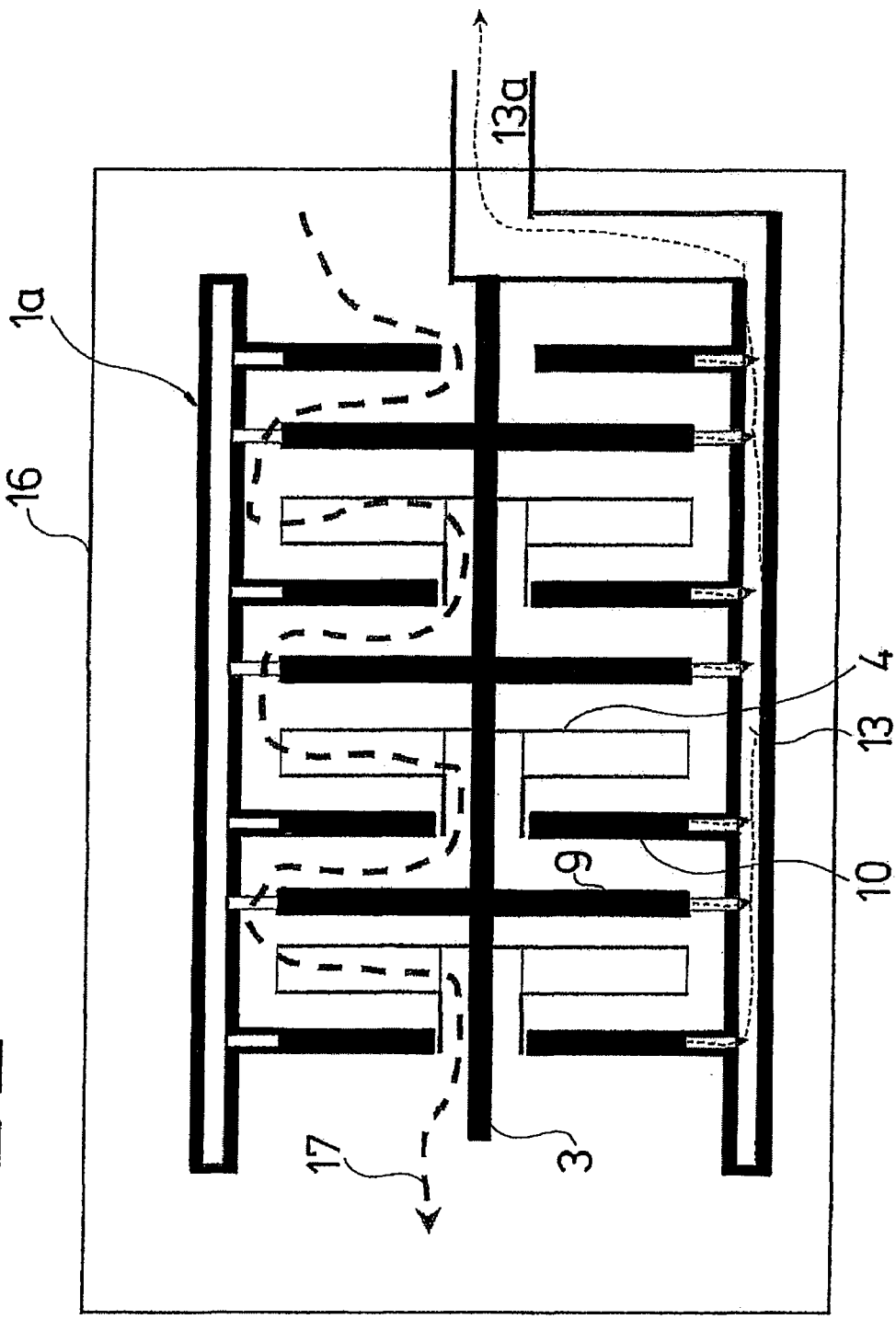
FIG. 3 is a schematic representation of alternative embodiment of the invention, shown in a representation similar to FIG. 2.

The alternative embodiment represented in FIG. 3 differs from that according to FIG. 2, in that with the filter device 1a, the shaft 3 with the centrifugal pump impellers 4 seated thereon, is firmly connected to the reactor housing 16, whereas the housing 2 with the filter plates 9 and 10 attached thereto, is rotatably driven within the reactor housing. For this, the discharge channel 13 is led into a central channel 13a, which is led out of the reactor housing 16, concentrically to the rotation axis of the housing and in a central manner. The throughflow direction 17 through the filter device 1a is accordingly exactly opposite to the throughflow direction 8 of the filter device 1.

Figure 4:
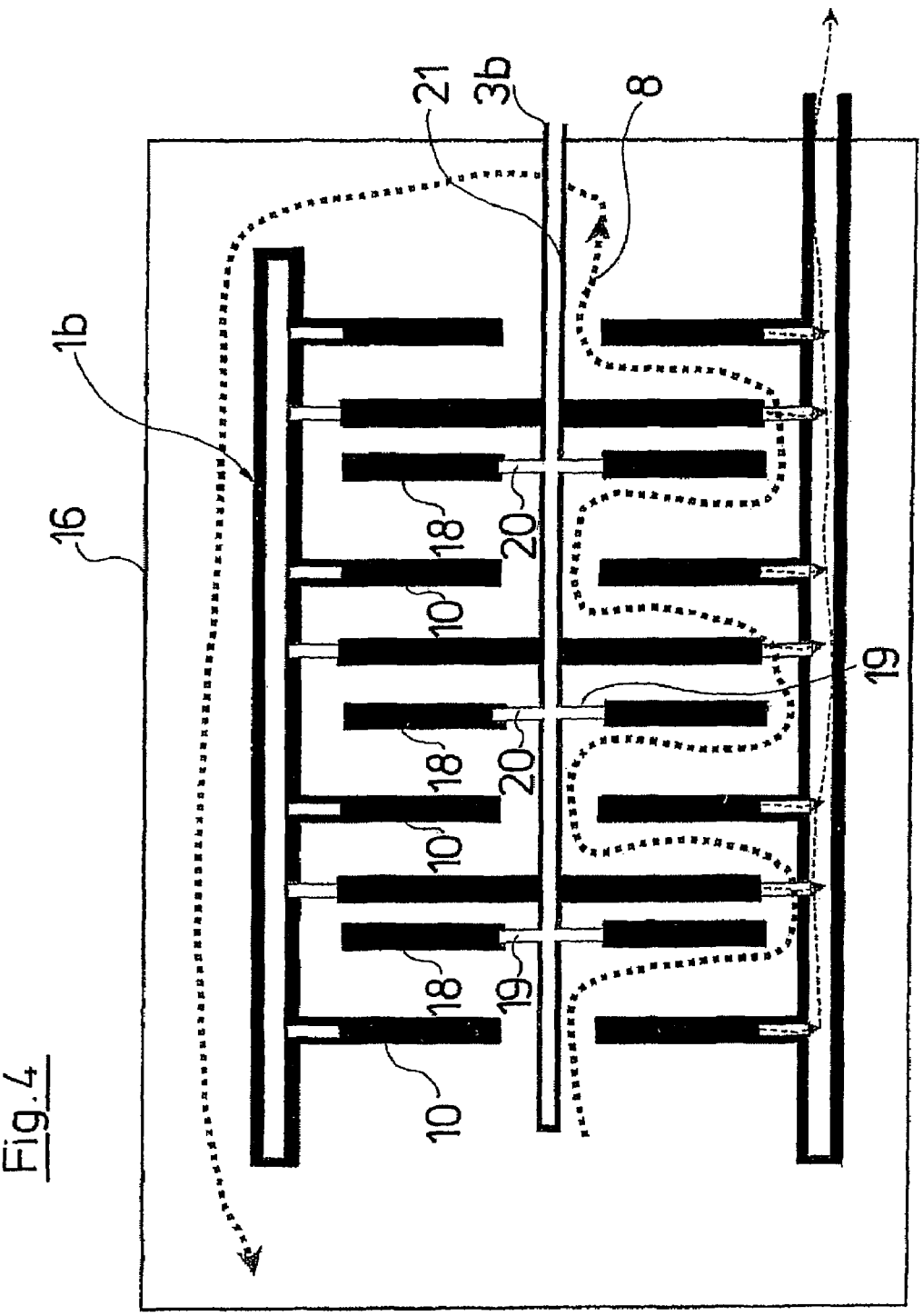
FIG. 4 is a schematic representation of another embodiment of a filter device according to the invention, in which filter plates are applied as rotation bodies, shown in a representation similar to FIG. 2.

The filter device 1b, which is arranged in the reactor housing 16 according to FIG. 4, differs from the filter device 1 represented by FIGS. 1 and 2 by the fact that filter plates 18 are inserted instead of the centrifugal pump impellers 4, and these filter plates in the same manner are hollow as the filter plates 9 and 10, but are arranged with a spacing from the housing 2, as with the filter plates 9, as well as with a spacing from the shaft 3b, as with the filter plates 10. The mechanical connection of the filter plates 18 to the shaft 3b is effected via spokes 19 which are directed from the inner periphery of the filter plates 18 radially to the shaft 3b and are fastened there. The spokes 19 are hollow, just as the shaft 3b, so that a radial channel 20 is formed via the inside of the spokes, which runs out into a central discharge channel 21 within the shaft 3b. Additional filter surface is created within the filter device 1b by the filter plates 18. The pump effect is achieved by a suction-port-like central recess being formed between the shaft and the inner periphery of the filter plate 18, through which recess only the spokes 19 pass, so that the fluid located in the filter device 1b, at both sides of the filter plate 18, may flow around this and be carried away radially to the outside, when the filter plate stack arranged on the shaft 3b is driven at an adequate speed. A sufficient speed is typically given when this is more than 3m/s, thus the filter plates 18 to the housing have a minimum speed of more than 3 m/s. The throughflow direction 8 corresponds therefore roughly to that of the filter devices 1 and 1a, wherein the filter plates are subjected to peripheral flow on both sides.

Figure 5:
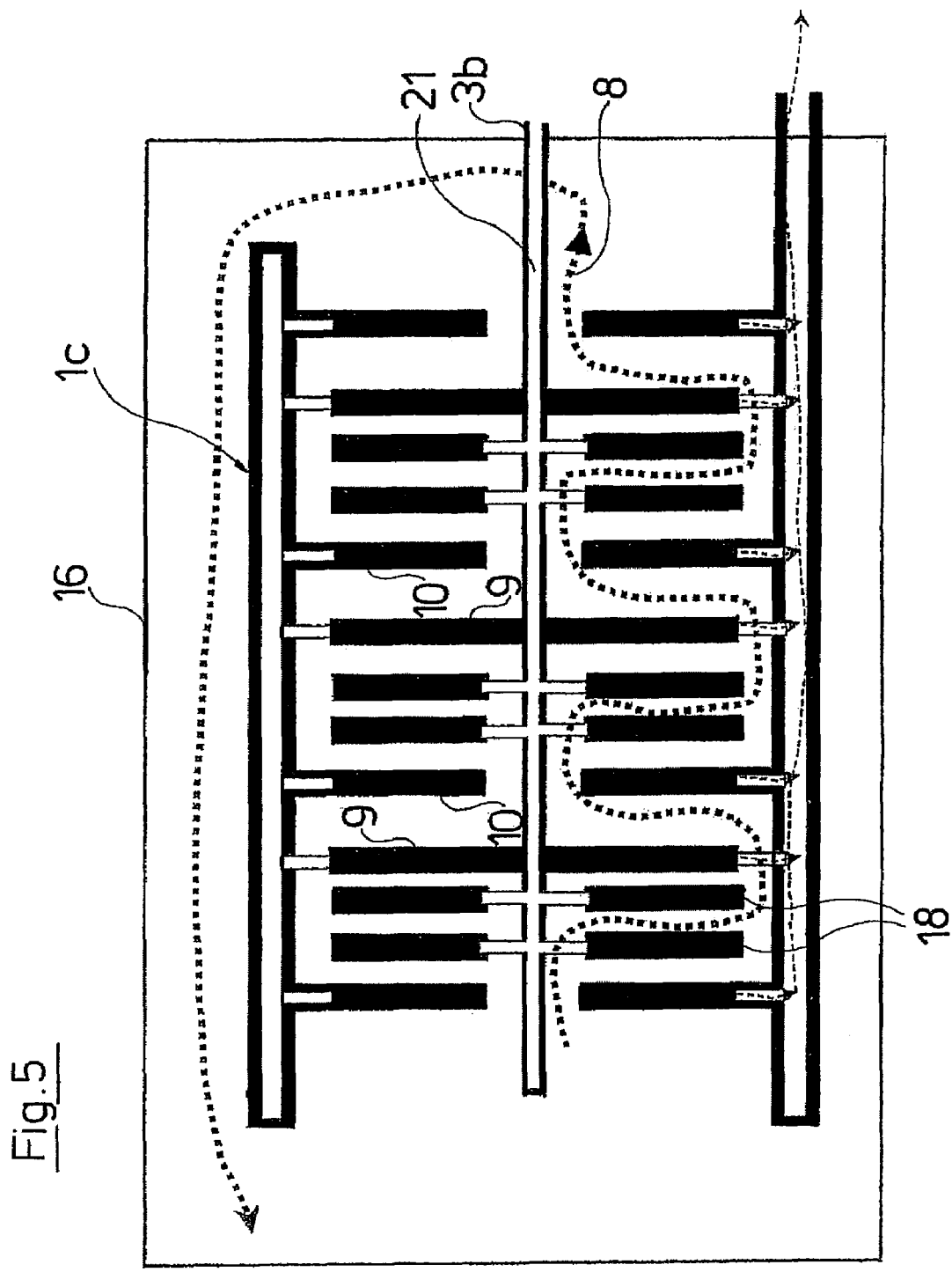
FIG. 5 is a schematic representation of a still another embodiment of a filter device according to the invention, in which filter plates are applied in a grouped manner, shown in a representation similar to FIG. 2.

One further embodiment of this device represented by FIG. 4 is represented in FIG. 5. There, instead of individual filter plates 18, these are arranged in groups, here in pairs, so that in each case a guidance device 7 connects in the flow direction 8 between a pair of filter plates 18. On the one hand, the filter surface is thereby further increased, and on the other hand, the pump effect, which is reduced compared to the centrifugal pump impeller arrangement, is improved, since the fluid is entrained radially to the outside in a particularly intensive manner, particularly in the region between a filter plate pair 18, when the shaft 3b is rotated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A filter device comprising a housing (2) having at least two rotation bodies (4, 18) arranged in the housing and driven by a shaft (3), the at least two rotation bodies (4, 18) being arranged in series in a flow direction of the housing (2), at least one guidance device (7) provided between each pair of the rotation bodies (4, 18), the at least one guidance device connecting a pressure side (6) of an upstream one of the rotation bodies (4, 18) to a suction side (5) of a downstream one of the rotation bodies (4, 18) so that a pressure level in the flow direction increases from an entry of the housing (2) to an exit of the housing (2) to produce a multistage centrifugal pumping effect, and a filter arrangement (9, 10) provided for the rotation bodies (4, 18) or intermediate spaces between the rotation bodies (4, 18).

2. The device according to claim 1, wherein the at least one guidance device (7) comprises at least two plates (9, 10) arranged in a stationary manner in the housing (2), wherein a first plate (9) in the flow direction (8) comprises a flow channel spaced from the shaft, and a second plate (10) seen in the flow direction (8) comprises a flow channel close to the shaft.

3. The device according to claim 2, wherein each rotation body is formed by a centrifugal pump impeller (4) having a suction port (5) projecting up into a recess of a stationary filter plate (10), and wherein the recess surrounds the shaft (3) with a spacing.

4. The device according to claim 1, wherein the filter arrangement comprises at least one plate (9,10) conductively connected to a discharge channel (13) arranged on an outside of the plate (9, 10).

5. The device according to claim 1, wherein a filter arrangement is formed by a hollow filter plate (9, 10, 18).

6. The device according to claim 1, wherein each rotation body is formed by a centrifugal pump impeller (4).

7. The device according to claim 1, wherein each rotation body is formed by a filter plate (18) conductively connected via at least one channel (20) to a discharge channel (21) in the shaft (3*b*) for discharge of filtered fluid.

8. The device according to claim 7, wherein the filter plate (18) forming each rotation body comprises at least one suction-port opening close to an outer periphery of the shaft (3*b*).

9. The device according to claim 7, wherein the filter plate (18) forming each rotation body comprises a central recess, and is connected via channel-forming spokes (19) to the shaft (3*b*).

10. The device according to claim 1, wherein the housing (2) has an essentially cylindrical shape, and an outer-side discharge channel (13) is formed by an annular channel of the housing (2).

11. The device according to claim 10, wherein the housing (2) is double-walled in a region of the annular channel.

12. The device according to claim 1, wherein the rotation bodies (18) are arranged in two or more groups of at least two rotation bodies (18).

13. A filter device comprising:
   a housing (2);
   a shaft (3) extending centrally through the housing (2) and being rotatable with respect to the housing (2);
   at least two impellers (4) being rotationally fixed to the shaft (3), each impeller (4) including a suction port (5) proximate the shaft (3) and a pressure side (6) proximate an inner side of the housing (2), fluid within the housing (2) being sucked into each impeller (4) at the suction port (5) thereof and exiting each impeller (4) at the pressure side (6) thereof; and
   a guidance device (7) hydraulically separating the at least two impellers (4), the guidance device (7) including a first filter plate (9) and a second filter plate (10) laterally spaced therefrom, each filter plate (9, 10) being fixedly connected to the housing (2), the first filter plate (9) extending to the shaft (3) and being sealed with respect to the shaft (3).

14. The device according to claim 13, wherein one end of the first filter plate (9) is connected to the inner side of the housing (2) via spokes (14).

15. The device according to claim 14, wherein a recess (15) is located between the shaft (3) and an end of the second filter plate (10) proximate thereto, the suction port (5) of one of the impellers (4) being positioned in the recess (15).

16. The device according to claim 15, wherein the housing (2) includes a discharge channel (13) at an outer periphery thereof, and the end of each filter plate (9, 10) proximate the inner side of the housing (2) includes a channel (11, 12) in fluid communication with the discharge channel (13).

17. A filter device comprising:
   a housing (2);
   a shaft (3*b*) extending centrally through the housing (2) and being rotatable with respect to the housing (2), the shaft (3*b*) having a central discharged channel (21) formed therein;
   at least two rotation bodies (18) each being rotationally fixed to the shaft (3*b*) via spokes (19), a channel (20) being formed between the spokes (19) and being in fluid communication with the central discharged channel (21) of the shaft (3); and
   a guidance device (7) hydraulically separating the at least two rotation bodies (18), the guidance device (7) including a first filter plate (9) and a second filter plate (10) laterally spaced therefrom, each filter plate (9, 10) being fixedly connected to the housing (2), the first filter plate (9) extending to the shaft (3*b*) and being sealed with respect to the shaft (3*b*).

18. The device according to claim 17, wherein one end of the first filter plate (9) is connected to an inner side of the housing (2) via spokes (14).

19. The device according to claim 18, wherein each of the at least two rotation bodies (18) includes a pair of spaced-apart filter plates (18).

* * * * *